United States Patent
Wolf et al.

(10) Patent No.: US 11,707,847 B2
(45) Date of Patent: Jul. 25, 2023

(54) POSITION DETECTOR AND METHOD FOR 3D POSITION DETERMINATION

(71) Applicant: TECAN TRADING AG, Mannedorf (CH)

(72) Inventors: Markus Wolf, Mannedorf (CH); Fred Schinzel, Mannedorf (CH); Claudio Monti, Jetikon am See (CH)

(73) Assignee: TECAN TRADING AG, Mannedorf (CH)

( * ) Notice: Subject to any disclaimer, the term of this patent is extended or adjusted under 35 U.S.C. 154(b) by 456 days.

(21) Appl. No.: 16/874,202

(22) Filed: May 14, 2020

(65) Prior Publication Data

US 2020/0376672 A1 Dec. 3, 2020

(30) Foreign Application Priority Data

May 28, 2019 (EP) .................................... 19177032

(51) Int. Cl.
| | |
|---|---|
| B25J 9/16 | (2006.01) |
| G06T 7/73 | (2017.01) |
| B25J 19/02 | (2006.01) |
| G01B 11/00 | (2006.01) |
| G01B 11/02 | (2006.01) |
| G01B 11/03 | (2006.01) |

(52) U.S. Cl.
CPC .......... *B25J 9/1692* (2013.01); *B25J 9/1664* (2013.01); *B25J 19/021* (2013.01); *G01B 11/002* (2013.01); *G01B 11/02* (2013.01); *G01B 11/03* (2013.01); *G06T 7/74* (2017.01)

(58) Field of Classification Search
None
See application file for complete search history.

(56) References Cited

U.S. PATENT DOCUMENTS

| | | | | |
|---|---|---|---|---|
| 4,025,201 A | * | 5/1977 | Deane | B07C 5/3408 209/939 |
| 4,280,624 A | * | 7/1981 | Ford | B07C 5/126 209/939 |
| 5,486,692 A | * | 1/1996 | Baldwin | G01N 21/9036 209/526 |

(Continued)

FOREIGN PATENT DOCUMENTS

| | | | | |
|---|---|---|---|---|
| DE | 102006038161 A1 | * | 2/2008 | ........... A61B 5/0059 |
| DE | 102006038161 A1 | | 2/2008 | |

(Continued)

*Primary Examiner* — Dominic J Bologna
*Assistant Examiner* — Jarreas C Underwood
(74) *Attorney, Agent, or Firm* — Notaro, Michalos & Zaccaria P.C.

(57) ABSTRACT

A position detector for generating 3D position information of an object in a position determination space for the object. The position detector has a camera with a lens and an image sensor that defines an imaging area with one first light deflecting element arranged in the imaging area as the camera and the at least one light deflecting element are adapted to simultaneously produce on the image sensor at least two images of the position determination space, a first image being produced by light beams deflected at the first light deflecting element, the at least two images differ with respect to the viewing direction of the position determination space.

22 Claims, 7 Drawing Sheets

(56) References Cited

U.S. PATENT DOCUMENTS

| | | | | |
|---|---|---|---|---|
| 5,530,551 | A | * | 6/1996 | Cantrall .............. G01N 15/0205 356/394 |
| 5,731,870 | A | * | 3/1998 | Bartko ................ G01B 11/2755 348/E7.086 |
| 5,761,540 | A | * | 6/1998 | White ................ G01N 21/8806 396/4 |
| 6,455,835 | B1 | * | 9/2002 | Bernardini .............. G06T 7/564 356/613 |
| 6,584,805 | B1 | * | 7/2003 | Burns .................... G01N 21/90 65/29.12 |
| 9,879,985 | B2 | * | 1/2018 | Basevi .................... G06T 7/521 |
| 2005/0096794 | A1 | * | 5/2005 | Yim .................. H01L 21/67766 700/258 |
| 2006/0023938 | A1 | * | 2/2006 | Ban ........................ B25J 9/1692 382/153 |
| 2008/0055593 | A1 | * | 3/2008 | Fox ...................... A61B 5/0071 356/244 |
| 2011/0160909 | A1 | * | 6/2011 | Glauser .................... B01L 3/02 700/264 |
| 2015/0033077 | A1 | | 11/2015 | Basevi et al. |
| 2016/0029104 | A1 | | 10/2016 | Arumugam et al. |
| 2020/0200779 | A1 | * | 6/2020 | Sigler ................ G01N 35/1065 |

FOREIGN PATENT DOCUMENTS

| | | | | |
|---|---|---|---|---|
| DE | 102018104640 | * | 8/2019 | ....... G01N 35/00693 |
| DE | 102018104640 A1 | * | 8/2019 | ....... G01N 35/00693 |
| EP | 1489425 A1 | | 12/2004 | |

* cited by examiner

POSITION DETECTOR AND METHOD FOR 3D POSITION DETERMINATION

The present invention relates to a position detector and a method for 3D position determination of an object in a position determination space. Further aspects of the invention relate to a robot system with the position detector according to the invention, a method for determining spatial coordinates, a method for operating a robot system, in particular a pipetting robot system, applications of the method and a system for determining spatial coordinates of an object.

Position detectors are used in various situations where a position of an object in three coordinate directions should be known exactly. In the following, the position determination of a pipette tip is discussed as an illustrative concrete example of such a situation.

Due to manufacturing tolerances in the production of a pipette or due to assembly tolerances when picking up a pipette tip, the relative position of a pipette tip to a pick-up of the pipette is subject to variations. Even if the pick-up of the pipette is positioned precisely and reproducibly, e.g. by a pipetting robot, the variations in the position of the pipette tip can possibly prevent small objects, such as the wells of a well plate, from being reached sufficiently reliably with the pipette tip. The quality and choice of material of the pipette tip have an effect on the extent of the variation in the position of the pipette tip and possibly exclude the use of well plates with small well spacing.

A position detector in the form of a plate with the outer dimensions of a standard microplate is known from patent specification EP 1 489 425 B1. It enables a positioning of functional elements, such as a pipette tip, by means of scanning beams from two light barriers whose beam directions are not parallel to the outer edges of the plate. This plate can be used in a method in which, in order to determine a position, an object is moved by means of a robot system in the X, Y or Z direction of a rectangular coordinate system in the area of said plate and the shading of the scanning beams is observed synchronously with this. In this way it is possible to determine the position of e.g. a pipette tip in relation to the plate.

The disadvantage of this method is that it takes a relatively long time to determine the position. Increasing the precision of the position determination requires a slower motion. A further disadvantage is that synchronization of the traversing motion of the robot system with the evaluation of signals from the light barrier receivers is necessary.

It is the object of the present invention to provide a device and a method which overcome disadvantages of the prior art. In particular, it is an object of the present invention to enable the determination of the position to be carried out in a shorter time. Furthermore, it is an object of the invention to enable the determination of the position to be carried out precisely in all three spatial dimensions.

The object is solved by a position detector according to claim 1.

The position detector according to the invention is used to generate 3D position information of an object in a position determination space for the object. The position detector comprises:
  a camera with a lens and an image sensor defining an imaging area, and
  at least one first light deflecting element arranged in the imaging area.

The camera and the at least one light deflecting element are adapted to simultaneously produce on the image sensor at least two images of the position determination space, thereby producing a first image by light beams deflected at the first light deflecting element, wherein the at least two images differ with respect to the viewing direction of the position determination space.

The 3D position information of the object can, for example, be contained in an image recording, which can be recorded by the image sensor. The position determination space is designed in such a way that it can at least partially receive the object whose 3D position is to be determined. Beam paths starting from the position determination space are imaged by the position detector according to the invention in at least two different ways into real images on the image sensor. These two different ways correspond to different viewing directions of the position determination space. The last stage of the imaging is performed through the camera lens. In front of the lens is at least one first light deflecting element. The position detector is designed in such a way that at least two such real images are simultaneously produced on the image sensor. At least one of the images is produced by light beams which are deflected at the first light deflecting element. The light deflecting element lies in the direct imaging area of the camera. The light deflecting element can be a mirror or a deflecting prism, for example. The light deflecting element deflects light beams in a defined way and is designed in such a way that the lens downstream along the beam path can image the deflected light beams into a real image. The light deflecting element can be designed to interact with the camera lens in such a way that, for example, a magnification effect can be achieved. The light deflecting element may also be designed for undistorted imaging. First and second images can be generated in different areas on the image sensor. The two images can also partially overlap and can be distinguished by color, wavelength range or polarization, for example. The beam paths to the first and second image can impinge on the camera lens from different directions or, for example, be merged in front of the camera via a semi-mirrored optical element.

The inventor has recognized that the proposed position detector can be used to determine 3D position information of an object in a very simple way. Due to the simultaneous generation of two images from different viewing directions, information about a third spatial dimension can also be determined, unlike in a conventional two-dimensional image. The determination of 3D position information can be carried out in a short time.

The present invention is applicable to a variety of situations in which the position of a reference point of an object, in particular an elongated object, in three coordinate directions should be known precisely. As a concrete example of such a situation, the determination of the position of a pipette tip was discussed in the introduction. A reference point of an object whose position can be determined by means of the present invention is, for example, the end of any elongated object. Apart from a pipette tip, this can also be the tip of a drill, the center of the end face of a milling cutter, a probe tip of a form tracer, the soldering tip of a soldering iron, etc.

Embodiments of the position detector result from the features of claims 2 to 12. Features of the dependent claims can be combined at will, provided they do not contradict each other.

In one embodiment, the position determination space lies within the imaging range of the camera.

In this embodiment, one of at least two images can be generated via direct beam paths from the position determination space to the camera lens. This embodiment can be particularly simple. For example, the position determination space can be located centrally in the imaging area of the camera and a single light deflecting element in a peripheral zone of the imaging area of the camera can be used to obtain the first direction of observation on the position determination space, which can be approximately perpendicular to the direct direction of observation, i.e. in this case the second direction of observation, on the position determination space.

In one embodiment of the position detector, the first light deflecting element is designed to deflect light on a first flat surface defining a first plane.

With this embodiment, an undistorted first image is achieved. The evaluation of the 3D position information generated with the position detector is particularly easy with this embodiment. The first flat surface can be a flat mirrored surface or a flat surface of an optical prism, for example. The first plane is an imaginary plane that continues the first flat surface beyond its edge. This first plane can, for example, have a normal that forms a certain angle with an optical axis of the camera, for example an angle in the range 20° to 50°. An angle slightly greater than 45° is suitable to provide a pair of orthogonal viewing directions together with a direct viewing direction to the position determination space. Small tilt angles with respect to the optical axis, e.g. in the range 0° to 30°, in combination with a position of the first light deflecting element which is further away from the camera than the position determination space, are useful to provide a direction of view of the object which shows a side of the object which is invisible in direct view.

One embodiment of the position detector also includes a second light deflecting element. The camera and the second light deflecting element are adapted to produce a second image of the at least two images by light beams deflected at the second light deflecting element.

In this embodiment, the first and second light deflecting element can be arranged in such a way that the beam paths from the object to the first and second image are essentially the same length. This allows both images to be focused on the image sensor at the same time. This embodiment can also be combined with an embodiment that allows a direct view of the position determination space, thus enabling a third image of the position determination space to be taken on the image sensor of the camera.

In one embodiment of the position detector, the second light deflecting element is designed to deflect light on a second flat surface which defines a second plane.

This embodiment has the advantage that the first and second images are undistorted, as already discussed above for the first image. The second plane is an imaginary plane that continues the second plane beyond its edge. The second light deflecting element can have the same features as discussed above for the first light deflecting element.

In a further embodiment of the position detector, which is a combination of features of two of the above-mentioned embodiments, both the first and second light deflecting elements are designed to deflect light on a first and second plane surface defining a first and second plane respectively.

In particular, the first and second light-deflecting elements may be two planar mirrors. For example, the position detector according to the invention can be implemented with only two light-deflecting elements, in particular mirrors, according to this embodiment, so that no further optical elements are required outside the camera than the two light-deflecting elements.

In one embodiment of the position detector in which the first and second planes are defined as above, the first and second planes intersect in an imaginary straight line perpendicular to an optical axis of the camera.

In this embodiment, the imaginary straight line and the optical axis can define a plane of symmetry of the device. In particular, such a plane of symmetry can pass through the position determination space. First and second images are thus generated for objects on the plane of symmetry via beam paths of equal length. First and second plane surfaces can extend close to the plane of symmetry. This arrangement has the advantage that the imaging area of the camera can be well utilized.

In a further embodiment of the position detector, the first and second planes define four space segments, wherein the camera and the position determination space are arranged in a first space segment of these four space segments and wherein the aperture angle of the first space segment is in the range of 100° to 140°.

With this embodiment, 3D position information that can be evaluated especially well can be generated. This is due to the fact that with this embodiment, largely independent viewing directions of the position determination space can be achieved for the first and second image. In particular, the aperture angle of the first space segment can be in the range from 130.0° to 135.0°. Thus, the directions of observation can be practically orthogonal to each other. For example, in an arrangement with mirror symmetry, the first and second planes can have a normal which is each inclined at about 23° to the optical axis of the camera. In this example, the aperture angle of the space segment is 134° (=180°−2* (23°)). In the borderline case of a large distance between camera and mirrors, orthogonal directions of observation can be achieved with angles of inclination of the mirrors of 22.5° each (i.e. with an aperture angle of the space segment of 135°).

In one embodiment of the position detector, the camera, the first light deflecting element and the second light deflecting element are arranged with respect to a central point in the position determination space in such a way that a first beam path from the central point via the first light deflecting element through the lens to the image sensor and a second beam path from the central point via the second light deflecting element through the lens to the image sensor in the central point extend orthogonally to each other.

With this embodiment, 3D position information that can be evaluated especially well can be generated.

One embodiment of the position detector further comprises at least one light source which is arranged to illuminate the position determination space.

The light source can increase the quality of the 3D position information, for example, image noise in an image recording containing the 3D position information can be reduced. For example, the light source may be designed to illuminate in flash mode. The light source may emit monochromatic light or light from a narrow wavelength band. This makes it possible to selectively filter out disturbing light from sources other than the light source in front of or inside the camera.

A further embodiment of the position detector comprises, in addition to the at least one light source, a first diffuser element for diffusing light, wherein the first diffuser element and the first light deflecting element are arranged opposite each other with respect to the position determination space, and wherein the at least one light source is arranged to illuminate the position determination space indirectly via the first diffuser element.

In this embodiment, a shadow image of the object is created in the first image, in which the outline of the object is particularly clear. Characteristic points of an object, such as an apex, can thus be identified particularly well. Furthermore, this embodiment is particularly suitable for determining a 3D position of an object with a reflective surface or an at least partially transparent object.

In particular, this embodiment may further comprise a second diffuser element, wherein the second diffuser element and the second light deflecting element are also arranged opposite each other with respect to the position determination space, and wherein the at least one light source is arranged to illuminate the position determination space indirectly via the second diffuser element. In this way, two similar shadow images are generated from two different viewing directions. A second light source may also be arranged specifically to illuminate the second diffuser element. In this case, the first and second light sources can differ, for example, in the color or wavelength of the emitted light, which allows two shadow images to be distinguished on the image sensor even if the images overlap. For example, with appropriate light sources, a first shadow image of the object against a red background and a second shadow image of the object from a different viewing direction and against a green background can be created simultaneously on the image sensor.

One embodiment of the position detector comprises a housing which surrounds the camera, the first light deflecting element, the position determination space and, where appropriate, the second light deflecting element and wherein the housing has an access opening for inserting at least one end of the object into the position determination space.

This embodiment generates 3D position information of particularly high quality. In this embodiment, interference caused by stray light or objects within the imaging range of the camera, which do not belong to the object for which 3D position information is to be collected, is largely eliminated. At the same time, objects whose position is to be determined can be easily exchanged through the access opening.

For example, the camera of the position detector has a lens with a focal length in the range 50 mm to 200 mm. In particular, the lens may have the characteristics of a telephoto lens.

The inventor has recognized that in this embodiment the 3D position information can be determined with particularly high precision. With a focal length in the mentioned range, the distortion of the image is very low and a large depth of field can be achieved.

A robot system according to claim 13 is also within the scope of the invention. The robot system according to the invention comprises a position detector according to the invention. In particular, the robot system may be a pipetting robot system.

Furthermore, the object is solved by a method according to claim 14.

The method according to the invention is a method for determining spatial coordinates of an object. The method comprises the steps:
a) Positioning at least a part of an object with respect to a camera;
b) generating at least two images of the object on the image sensor of the camera, wherein at least one of the images is generated by a reflection of the object and wherein the at least two images reproduce the object from different viewing directions; and
c) determining the spatial coordinates of the object from the at least two images.

With the method according to the invention, the spatial coordinates of the object can be determined very quickly.

A variant of the method is used to determine the spatial coordinates of an object in the position determination space of a position detector according to the invention.

The method comprises the following steps:
a) Positioning of at least a part of the object in the position determination space;
b) generating an image recording by means of the camera, wherein the image recording contains the first and the second image and wherein the first image is generated by means of beam paths deflected at the first light deflecting element;
c1) in the image recording generated in step b), evaluation of the first image, wherein a first horizontal-vertical position of the object within the image is determined;
c2) in the image recording generated in step b), evaluating the second image, wherein a second horizontal-vertical position of the object within the image is determined;
c3) calculating the spatial coordinates of the object as a function of the first and second horizontal-vertical position.

As a basis for the calculation in step c3), for example, a calibration procedure can be carried out in advance, in which an object is shifted by known coordinate values in three independent spatial directions and steps a), b), c1), c2) and c3) are carried out. From the relationship between the determined positions in the image recording and the known coordinate changes, a linear system of equations for the conversion coefficients between horizontal-vertical position in the two images and spatial coordinates can be established and solved. Such a calibration procedure can be performed on a precision cross table, for example, on a CNC machine with a position resolution of 10 µm or better.

The inventor has recognized that the use of 3D position information from an image recording with the position detector according to the invention leads to particularly precise and reproducible spatial coordinates.

In one variant of the method, step c3) involves calculating the spatial coordinates of the object as a function of the mean value of the first and second horizontal-vertical positions and the distance between the first and second horizontal-vertical positions.

In this variant of the method, a first coordinate can be determined from the mean value of the two vertical positions. A second coordinate can be determined from the mean value of the two horizontal positions. A third coordinate can be determined from the distance between the first and second horizontal-vertical positions. This coordinate is independent of the first and second coordinate and ensures that the combination of all three coordinates results in spatial coordinates.

Further within the scope of the invention is a method for operating a robot system according to the invention. The method comprises the following steps:
Performing the steps of the method according to the invention to determine a first spatial coordinate of a reference point of a first object while the first object is held by the robot system in the position determination space;
Determining a first parameter set of a first motion sequence of the robot system, by means of which the robot system brings the reference point of the first object from the position determination space to a target position;
Performing the steps of the method according to the invention to determine a second spatial coordinate of a reference point of a second object while the second object is held by the robot system in the position determination space;

Correcting the first parameter set of the first motion sequence as a function of a difference between first and second spatial coordinates to obtain a second parameter set for a second motion sequence of the robot system;

Performing the second motion sequence based on the second parameter set with the second object.

The method for determining the first spatial coordinate of the reference point of the first object can be carried out before or after the first set of parameters of the first motion sequence is defined. In the combination of the two steps, a reference point, a kind of virtual zero point, is defined in the position determination space, from which the first motion sequence leads exactly to the desired target position. Further motion sequences can be corrected with respect to the deviation of the corresponding reference point of the second object and other objects from the previously defined reference point in such a way that the corresponding reference point of the other objects is also guided to the target position. Variations in the exact position of the reference point, which may be the tip of a pipette, for example, can thus be compensated. Such variations can, for example, be caused by individual geometric deviations of the objects, for example of pipettes. For example, slight curvatures of long hollow needles can hardly be avoided, which leads to deviations between the position of the pick-up of the needle and the tip of the needle in the plane perpendicular to the needle axis. Variations can also be caused by not always perfect repeatability of the pickup of the object by the robot system. For example, the repeated attachment of a pipette to the corresponding receptacle leads to slight variations in the spatial position of the pipette tip compared to the receptacle, even if the pipette is identical. The method according to the invention compensates for all these variations regardless of the exact cause.

The invention is further directed towards applications of the method according to the invention for operating a robot system.

In one application of the method, the robot system is a pipetting robot system and the first object is a pipette tip and the second object is a pipette tip.

With this application, a high precision in the approach of wells is achieved, independent of production tolerances of pipette tips. This allows, for example, a less expensive version of pipettes to be used together with well plates with small hole spacing, such as standard well plates with 96 wells, 384 wells or 1536 wells, without increasing the risk of pipetting errors.

For example, the first object can be a first pipette tip and the second object can be a second pipette tip that is different from the first pipette tip. For example, the second object can also be the first pipette tip, but after the first pipette tip has been used to pierce the lid of a container, for example. For example, pipette tips in the form of long metal cannulas can be used to pierce a lid of a container. This may slightly change the geometry and thus the position of the pipette tip. In this sense, the pipette tip before and after a piercing process is a first and a second object, whose 3D positions can be determined separately according to the method in accordance with the invention.

For example, the pipetting robot can move arrangements of several pipettes together, for example 4 or 8 pipettes in a row. In this case, for example, an individual deviation from its target position can be determined for each of the several pipettes in the position detector. For example, the entire arrangement of several pipettes can then be moved together to a rough position and dispensing from each pipette can then, for example, be performed separately, wherein immediately before dispensing, an individual micro-correction of the position can be performed based on the offsets determined in the position detector.

In one variant of the application, the target position is above a MALDI target plate, i.e. a target plate for Matrix Assisted Laser Desorption Ionization.

In this variant of the application, an analyte in solution can be pipetted very precisely to that part of the target plate which is hit by a LASER beam in the following step. In this way, a pulse with analyte molecules is generated immediately, without the need for a previous time-consuming search for the area on the target plate with the highest analyte concentration. This variant of the application is particularly suitable as a preparatory step for mass spectrometry with time-of-flight analysis (TOF) based on Matrix Assisted Laser Desorption Ionization (MALDI-TOF).

For example, a transport device with a carrier for the MALDI target plate is mounted on the same platform on which the position detector is mounted. The transport device is used to transport the target plate from a pipetting position into the MALDI-TOF mass spectrometer. In this way, a particularly high reproducibility can be achieved when hitting the position which is hit by the LASER beam of the MALDI-TOF mass spectrometer.

A possible procedure includes the following steps:

Pick-up of a pipette tip.

Moving the first pipette tip into the position determination space of the position detector and determining first spatial coordinates of the pipette tip a first time according to the method according to the invention. This defines a reference point for pipette tips used later.

Moving the pipette tip to the exact desired dispensing position above the MALDI target plate. The MALDI target plate is in the pipetting position. A coarse position may, for example, be approached in advance along a programmed path. Moving to the exact position may be controlled by a user using arrow keys in a so-called teach mode of the robot controller. The exact target position may, for example, be identified by rings printed on the target plate, wherein the center of a ring corresponds to the target position.

Saving target coordinates as coordinates of the robot system. Thus, the distance in all spatial coordinates between the reference point in the position detector and the target coordinates is known.

Pick-up of a second pipette tip.

Moving the second pipette tip into the position determination space of the position detector and determining second spatial coordinates of the pipette tip according to the method according to the invention. This results in a difference in the position of the second pipette tip from the previously determined reference point.

Approaching target coordinates above the MALDI target plate, both the distance between the reference point in the position detector and the target coordinates being taken into account and the determined difference in the position of the second pipette tip to the previously determined reference point being taken into account.

In the same way, several target coordinates can be determined, for example, in addition to the dispensing position above a MALDI target plate, the coordinates of a specific well on a microplate where, for example, an analyte is to be received by aspiration. The stored displacement can then be taken into account in an effective pipetting procedure by taking it into account when determining the control commands for a path from a well at which an analyte is picked up to the desired dispensing position above the MALDI target plate.

In another variant of the application, the target position is defined on a cultivation plate and the second parameter set of the second motion sequence is further adjusted based on the coordinates of a bacterial colony on the cultivation plate.

By varying the application, it is possible to punch out areas of a bacterial colony, which areas have been precisely defined in a microscope image, using a pipette tip and to bring them to a further analysis. Production tolerances of the pipette tips thus have hardly any influence on the positioning accuracy when punching the sample out of the cultivation plate.

Even further within the scope of the invention is a system for determining spatial coordinates of an object in a position determination space, wherein the system comprises a position detector according to the invention and further an evaluation unit. The image sensor and the evaluation unit are operatively connected for the transmission of image data. Furthermore, the system is set up to carry out the method according to the invention for determining spatial coordinates of an object. The evaluation unit can be formed by the control computer of a robot system, for example. The evaluation unit can also be located at a distance from the position detector. Image data can, for example, be transmitted via a wired or wireless computer network.

Embodiment examples of the present invention are explained in more detail below using figures, wherein.

Figure 1:
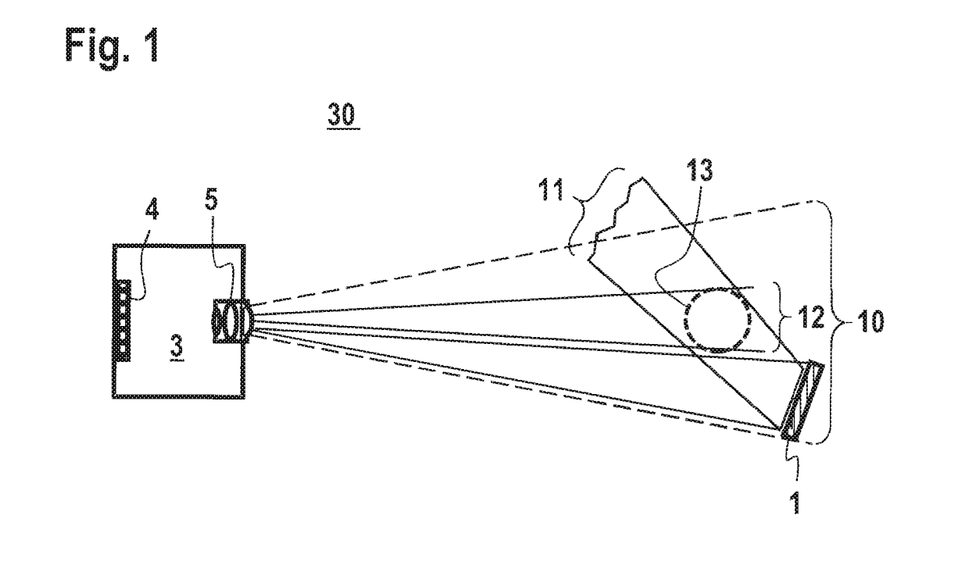
FIG. 1 shows a schematic cross-section of a position detector according to the invention.

FIG. 1 shows a schematic cross-section of a position detector 30 according to the invention. A camera 3 with an image sensor 4 and a lens 5 defines an imaging area 10 in front of the camera. A first light deflecting element 1, shown here as a mirror, is located in imaging area 10, which can be directly imaged by the camera. The first light deflecting element 1 defines a first indirect field of view 11 to the position determination space 13, in which the position of an object can be determined. From the camera, there is a second field of view 12 to the position determination space 13. Shown here is a direct view of the position determination space 13. The first field of view 11 and the second field of view 12 differ in their viewing direction of the position determination space. In this arrangement of camera 3 and light deflecting element 1, a first and a second image of the position determination space can be simultaneously generated on image sensor 4 from the first 11 and second 12 field of view.

Figure 2:
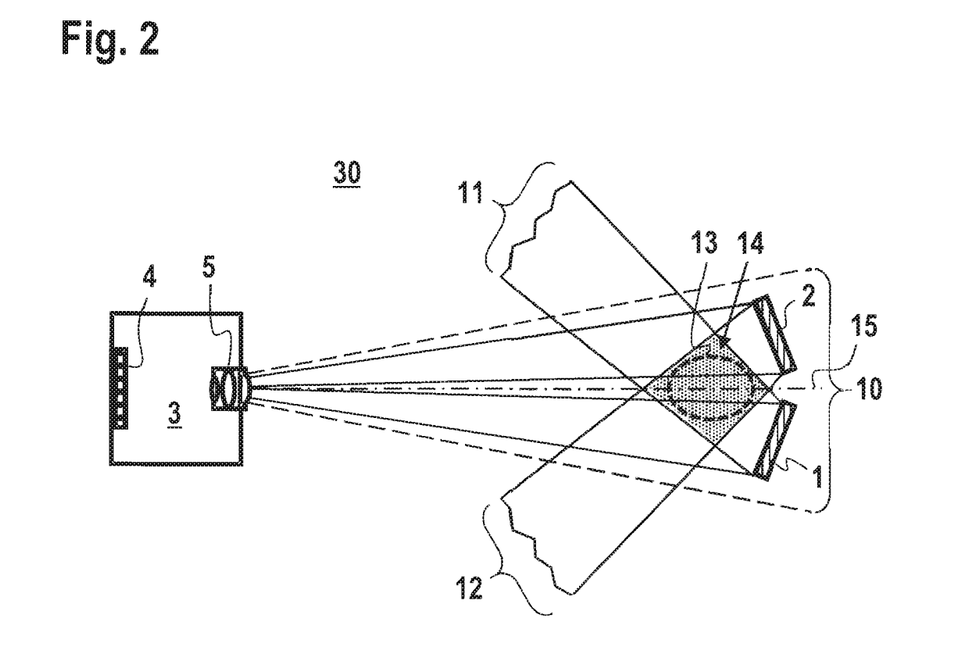
FIG. 2 shows a schematic cross-section of an embodiment of the position detector.

FIG. 2 shows an embodiment of the position detector 30. In this embodiment, a first 1 and a second 2 light deflecting element are arranged in the imaging area 10 of camera 3. Both a first field of view 11 and a second field of view 12 are defined by deflected light beams. The two fields of view overlap in an overlapping area 14, which contains the position determination space 13. Camera 3 defines an optical axis 15. In the arrangement shown, light deflecting elements 1, 2 and fields of view 11, 12 are arranged symmetrically to the optical axis.

Figure 3:
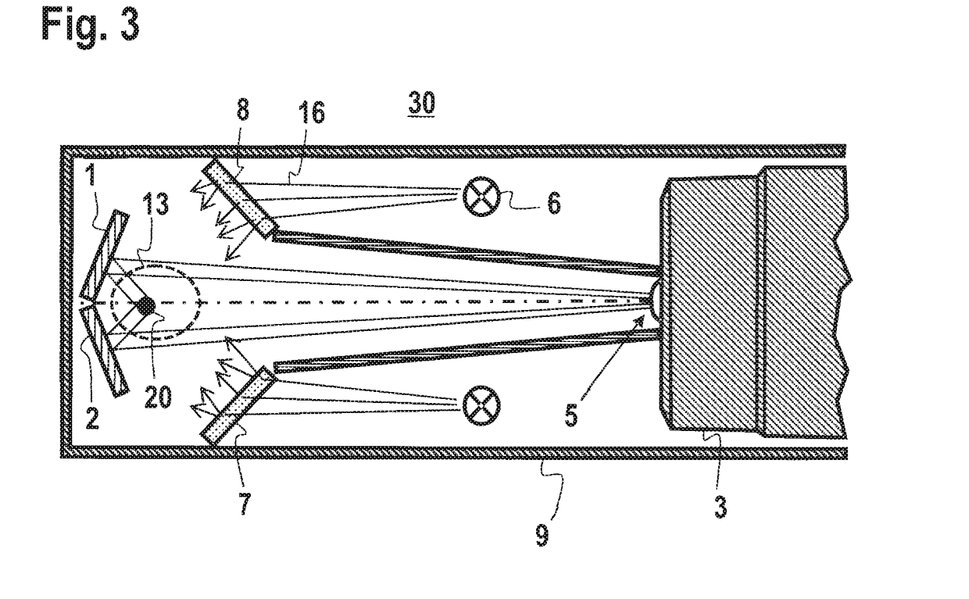
FIG. 3 shows a schematic cross-section of an embodiment of the position detector.

FIG. 3 shows a schematic cross-section of the position detector 30, which further comprises a housing 9 surrounding a camera 3, a first light deflecting element 1, a second light deflecting element 2 and the position determination space 13. The housing 9 may have light-tight walls. Furthermore, in the illustration, there is an object 20 in the position determination space. Light beams emanating from the object, which are deflected at the first and second light deflecting element and enter the camera lens 5 are indicated by thin lines. Further light sources 6, 6' are arranged in this embodiment. A first diffuser element 7 is arranged opposite the first light deflecting element 1 with respect to the position determination space 13. Light from a light source is diffusely scattered by the diffuser element, which can be a glass pane with a rough surface or a porous plastic block, for example. The object 20 is thus projected onto the image sensor of the camera as a kind of shadow image. Symmetrically, a second diffuser element 8 is present, which plays the corresponding role for the second light deflecting element. Apertures shield the camera lens from direct light from the light sources or the diffuser elements. The entire arrangement is essentially symmetrical to the optical axis of the camera.

Figure 4:
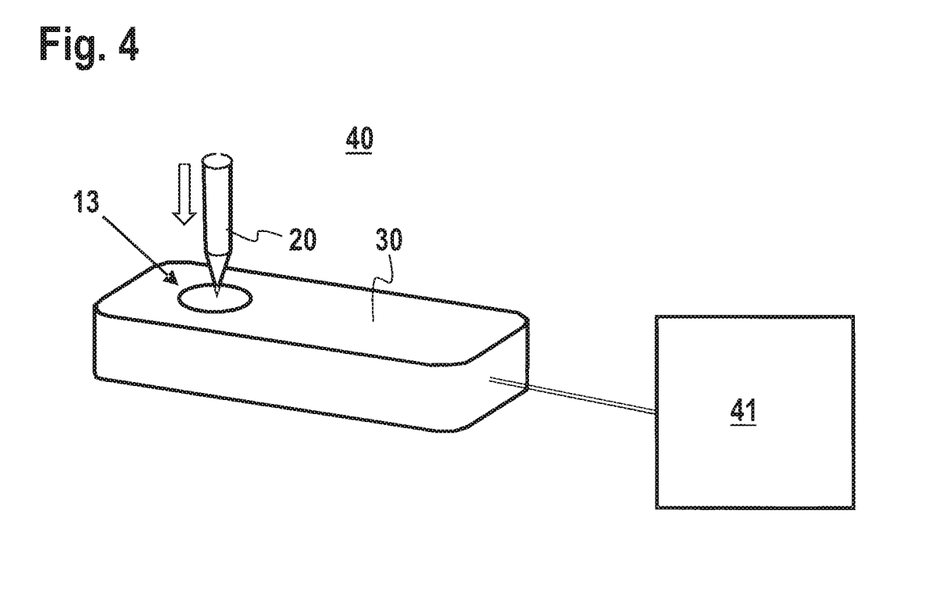
FIG. 4 shows a schematic representation of a system for determining the spatial coordinates of an object.

FIG. 4 shows a schematic representation of a system 40 for the determination of spatial coordinates of an object 20. The system 40 comprises a position detector 30 and an evaluation unit 41. Symbolically represented as a double line is an active connection for the transmission of image data from the position detector to the evaluation unit. Image data can be transmitted, for example, via a cable for a serial or parallel interface, for example, via a USB cable. The active connection for transmitting image data can also be a wireless connection, e.g. a WiFi connection. In the illustration shown, the position detector has an access opening to a position determination space 13 into which the object 20 can be at least partially inserted. The system is set up to perform the method according to the invention, e.g. according to the flow chart in FIG. 5. The evaluation unit contains, for example, a microprocessor and a working memory in which software for carrying out the method is loaded. The evaluation unit can also be installed directly in the camera. In this case it is possible that the camera only passes on already interpreted data to a control computer of an overall system in which the position detector can be installed. Such a complete system can be, for example, a robot system, in particular a pipetting robot system.

Figure 5:
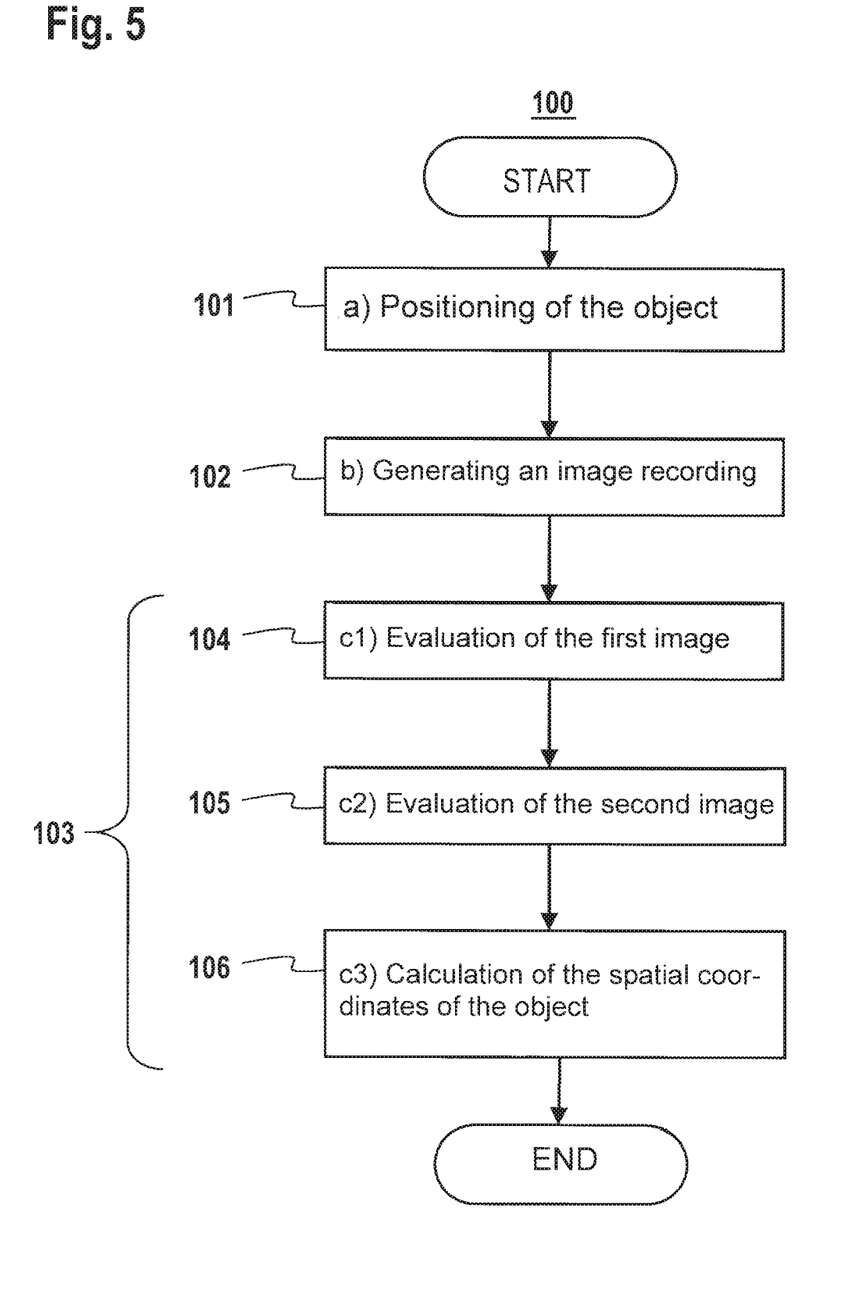
FIG. 5 shows a flow chart for a variant of the method for determining the spatial coordinates of an object.

FIG. 5 shows a flowchart of the method 100 according to the invention for determining the spatial coordinates of an object. The method comprises the steps of a) positioning (101) at least a part of an object with respect to a camera;

b) generating (102) at least two images of the object on the image sensor of a camera, wherein at least one of the images is generated by a reflection of the object and wherein the at least two images reproduce the object from different viewing directions; and c) determining (103) the spatial coordinates of the object from the at least two images. In an embodiment, step 103 comprises the substeps of c1) evaluating (104) the first image from the image acquired in step b), wherein a first horizontal-vertical position (H1, V1) of the object within the image is determined;

c2) evaluating (105) the second image from the image recording acquired in step b), wherein a second horizontal-vertical position (H2, V2) of the object within the image is determined;

c3) calculating (106) the spatial coordinates of the object as a function of the first and second horizontal-vertical positions.

In the case of Cartesian coordinates x, y, z, the last step of the calculation can be represented as $$x=Fx\ (H1, H2, V1, V2),$$

$$y=Fy\ (H1, H2, V1, V2),$$

$$z=Fz\ (H1, H2, V1, V2).$$

The mathematical functions Fx, Fy, Fz depend on the imaging properties of the camera as well as on the mutual arrangement of the camera and the light deflecting elements. For example, in an arrangement in which the x-axis is parallel to the horizontal axis of the image sensor, the z-axis is parallel to the vertical axis of the image sensor and the y-axis is parallel to the optical axis of the camera, the coordinates can be calculated approximately as follows:

$$x=a_x(H1+H2)/2,$$

$$y=b(H1-H2),$$

$$z=a_z(V1+V2)/2.$$

Here $a_x$, $a_z$ and b are coefficients that take into account the conversion of the units used (for example, millimeters per pixel) and the imaging scale. In simple cases, the imaging scale is identical in horizontal and vertical direction and $a_x=a_z=a$ applies. Other terms can correct a coordinate zero point or take into account imaging scales that vary with the distance of the object from the camera. A subsequent mathematical rotation of the coordinate axes or a conversion of the coordinates into coordinates of, for example, a cylindrical coordinate system or a spherical coordinate system is also possible.

Figure 6A:
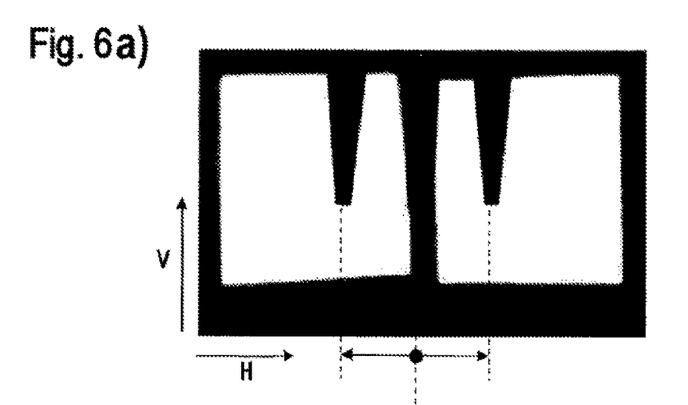
FIGS. 6a) to 6c) show image recordings of a pipette tip in different positions in the position determination space of a position detector.

FIG. 6 shows in FIGS. 6*a*) to 6*c*) image recordings of a pipette tip in different positions in the position determination area of a position detector. In FIGS. 6*d*) to 6*f*), a schematic cross-section is shown in each case to illustrate the respective positions of the pipette tip on the picture according to the right hand adjacent figure, i.e. FIG. 6*d*) shows the position with respect to the picture in FIG. 6*a*) etc.

Figure 6B:
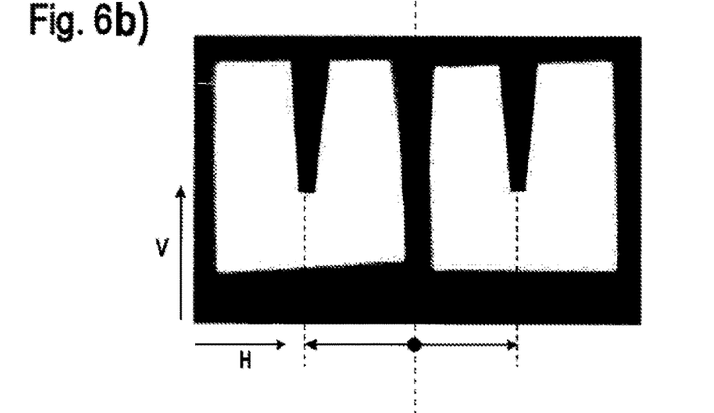
Figure 6C:
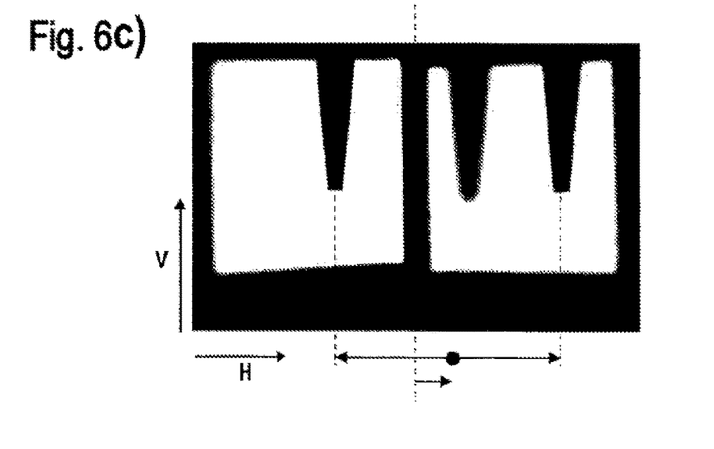
Figure 6D:
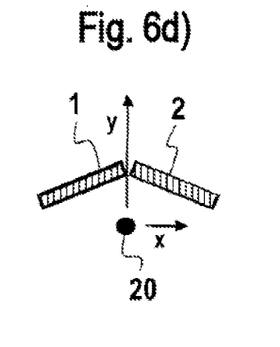
FIGS. 6d) to 6f) show schematic cross sections to illustrate the respective positions of the pipette tip.

In the image recordings according to FIGS. 6*a*) to 6*c*), a first and a second light deflecting element, here a planar mirror, each illuminated by a diffusor element, are visible in white in the left and right half of the image. A pipette tip, which can be seen in the two halves of the picture under different viewing directions, is shown as a shadow image in black with sharp edges. This is a first and second image, each of which is produced by deflected light beams.

Figure 6E:
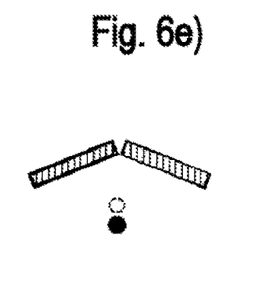
Figure 6F:
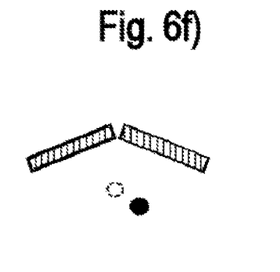

A third blurred image of the pipette tip can be seen in FIGS. 6*a*) and 6*b*) in the area of the dark zone in the middle of the image recording and in FIG. 6*c*) offset to the right. This is the directly imaged pipette tip, which is not in focus because the camera lens is focused at a distance corresponding to the distance to the virtual image in the mirrors. At the edge of FIG. 6*a*) are drawn horizontal direction H and vertical direction V of the image recording, which also apply to the other two image recordings. In all three figures FIGS. 6*a*) to 6*c*) the horizontal positions of the pipette tip are marked by dashed vertical lines in the first and second image. At the lower edge of the picture, one center of each of the two horizontal positions is marked by a black filled circle. Furthermore, the distance between the two horizontal positions is marked by a double arrow. FIG. 6*a*) and FIG. 6*d*) show the pipette tip in a reference position. FIGS. 6*b*) and 6*e*) show the pipette tip after it has been moved away from the reference position towards the camera; the reference position is shown in FIG. 6*e*) by a dotted circle. The pipette tips visible in the two images now have a greater distance with respect to their horizontal positions. This distance contains the information about the third spatial dimension, which corresponds to the distance from the camera and in the coordinate system according to FIG. 6*d*) corresponds to the y-direction. FIGS. 6*c*) and 6*f*) show the pipette tip after a further shift to the right and in x-direction, respectively. This displacement is shown by a shift of the center of the horizontal positions of the pipette tip to the right, as indicated by the simple arrow at the bottom of FIG. 6*c*). Also the blurred direct image of the pipette tip has moved to the right. A third coordinate direction, the z-direction, together with the x- and y-direction form a right-handed Cartesian coordinate system. In the arrangement shown here, the z-direction is aligned parallel to the vertical direction of the image sensor and can be read directly from the V-position in the image recording. In the sequence of image recordings shown here, the z-position of the pipette tip was not changed. In all image recordings, it is approximately half the height of the vertical direction V.

Figure 7:
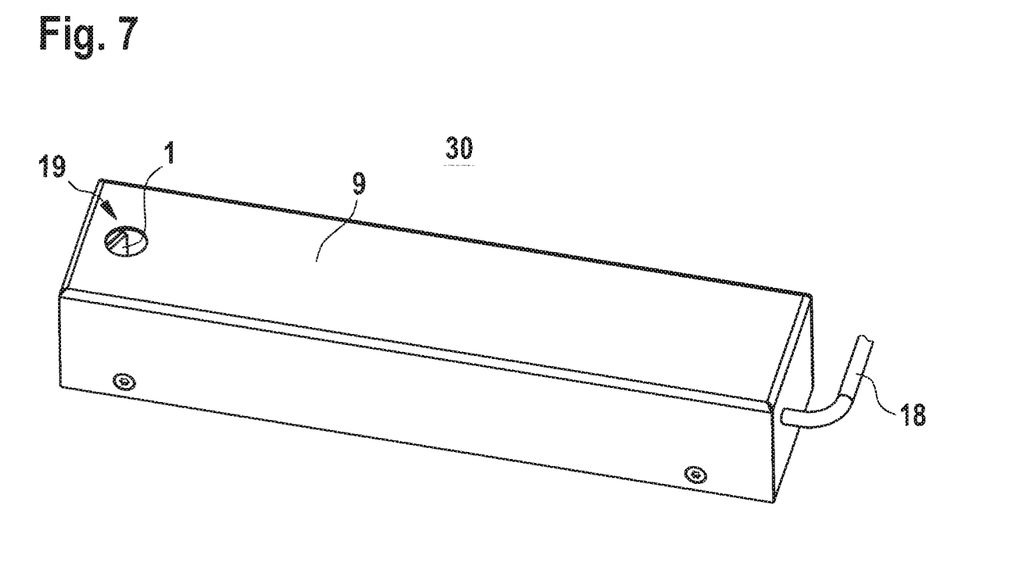
FIG. 7 shows a perspective view of an embodiment of the position detector.

FIG. 7 shows a perspective view of an embodiment of a position detector 30. In this case, the position detector 30 comprises a substantially cuboid housing 9 with an access opening 19 in an upper wall. A first light deflecting element 1 in the form of a planar mirror can be seen through the access opening. Through the access opening 19 an object can be introduced into the position determination space of the position detector. The position detector shown is suitable for measuring the position of a tip of an elongated object. A cable 18 leading through a wall into the housing 9 contains lines for power supply of the position detector and for data transmission.

Figure 8:
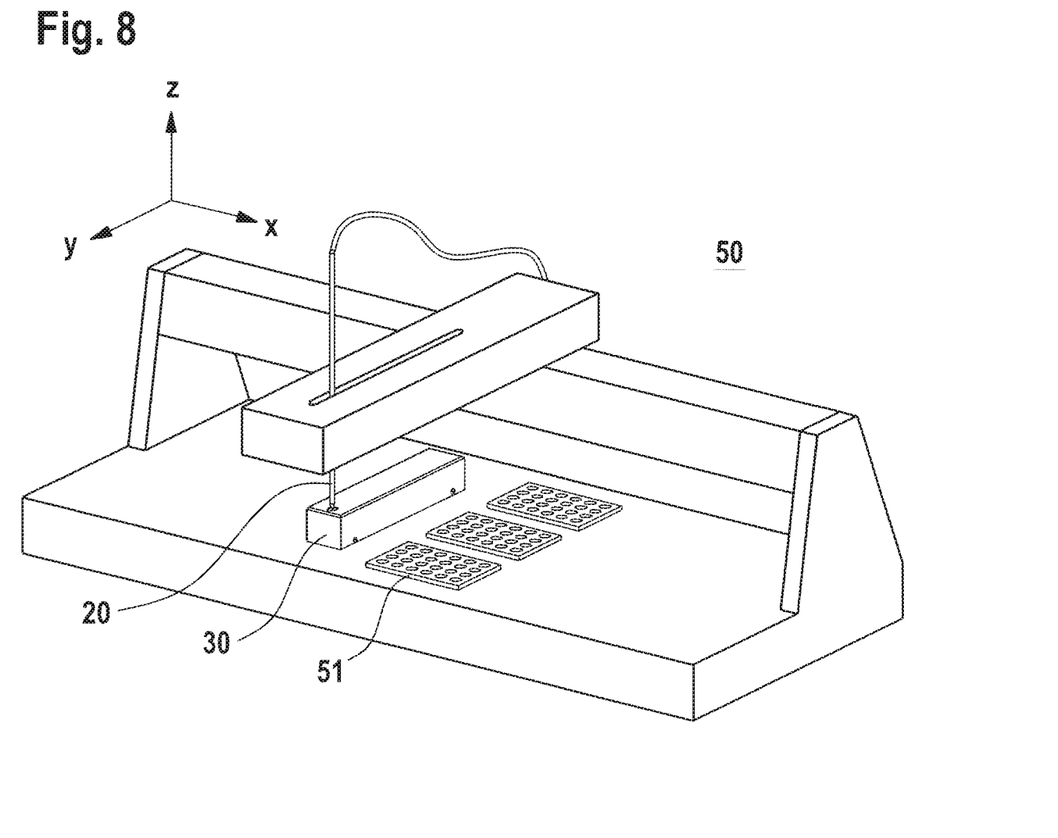
FIG. 8 shows a robot system with position detector according to the invention.

FIG. 8 shows a robot system 50 with a position detector 30. The robot system shown is a pipetting robot system, which can move a pipette in three coordinate directions x, y and z, which are represented by arrows of the coordinate system in the upper left corner of the figure. The object 20, whose position can be determined by the position detector 30, is the pipette of the pipetting robot. The pipetting robot includes linear axes for moving and positioning the pipette tip. The pipette is connected via a flexible hose to a pump unit of the pipetting robot (not shown here). In the illustration shown, the pipette tip is located directly above the access opening of the position detector and could next be lowered into the position determination space, for example, by moving the pipette in the z-direction. Well plates 51 are arranged on a work surface of the pipetting robot system within reach of the travel range of the linear axes. According to the present invention, the precision with which the individual wells in the well plates 51 can be approached can be significantly increased on the basis of 3D position information about the pipette tip. For reasons of illustration, only well plates with 4×6 wells are shown here. The precision in approaching the well positions is particularly important when well plates of the same size with a much larger number of wells on the same surface are used, for example 8×12 wells, 16×24 wells or even 32×48 wells.

Figure 9:
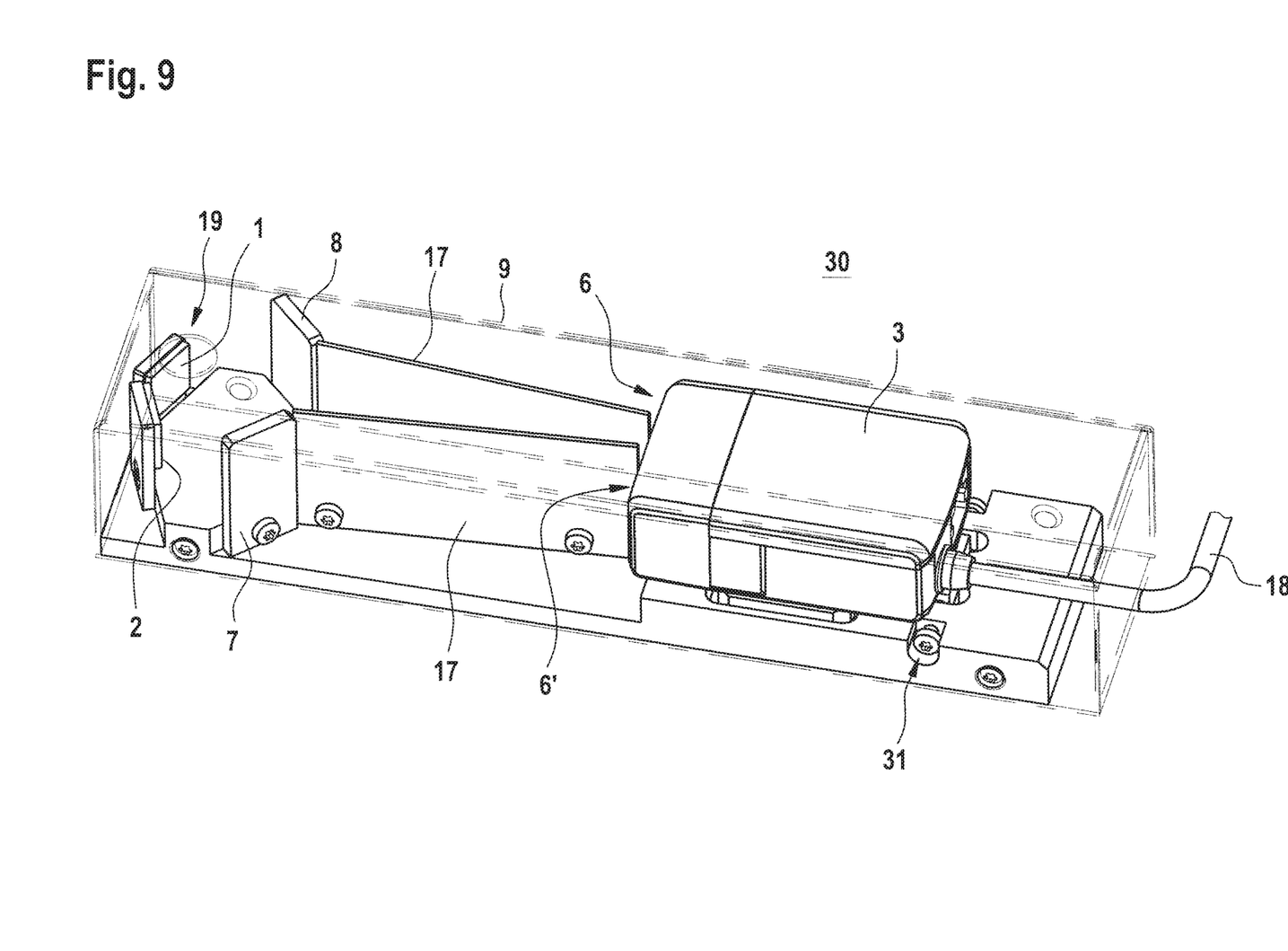
FIG. 9 shows a perspective view of the embodiment according to FIG. 7 with a view into the housing.

FIG. 9 shows an embodiment of the position detector 30 in a perspective view. The position detector has the elements already discussed in the embodiment shown in FIG. 3. The housing 9 is shown transparent only for this illustration, so that the arrangement of the elements within the housing can be seen. Light sources in this embodiment are mounted directly on the front of the camera and are not directly visible in FIG. 9. The light deflecting elements 1, 2 are planar mirrors here. The two planar mirrors each define a first and second plane which intersect in a straight line perpendicular to the optical axis of the camera. The two mirrors each essentially fill half of the imaging area of camera 3. An access opening 19 in the housing allows objects or at least a part of an object to be inserted into the position determination area of the position detector 30. The camera has a cable connection for power supply and for transmitting image data via cable 18. A base plate supports the light deflecting elements 1, 2, the diffuser elements 7, 8 and the shielding elements 17 and determines their exact position within the position detector. A means 31 for adjusting the orientation of the camera within the position detector is formed as a hexagon socket screw screwed into an upwardly protruding portion of the base plate, which presses at its end on a base of the camera 3. With the hexagon socket screw visible in the lower right corner of the figure and a counteracting screw on the opposite side, the exact position of the camera relative to the base plate of the position detector can be adjusted, i.e. means 31 allows fine adjustment of the orientation of the camera relative to the other elements of the position detector.

Figure 10:
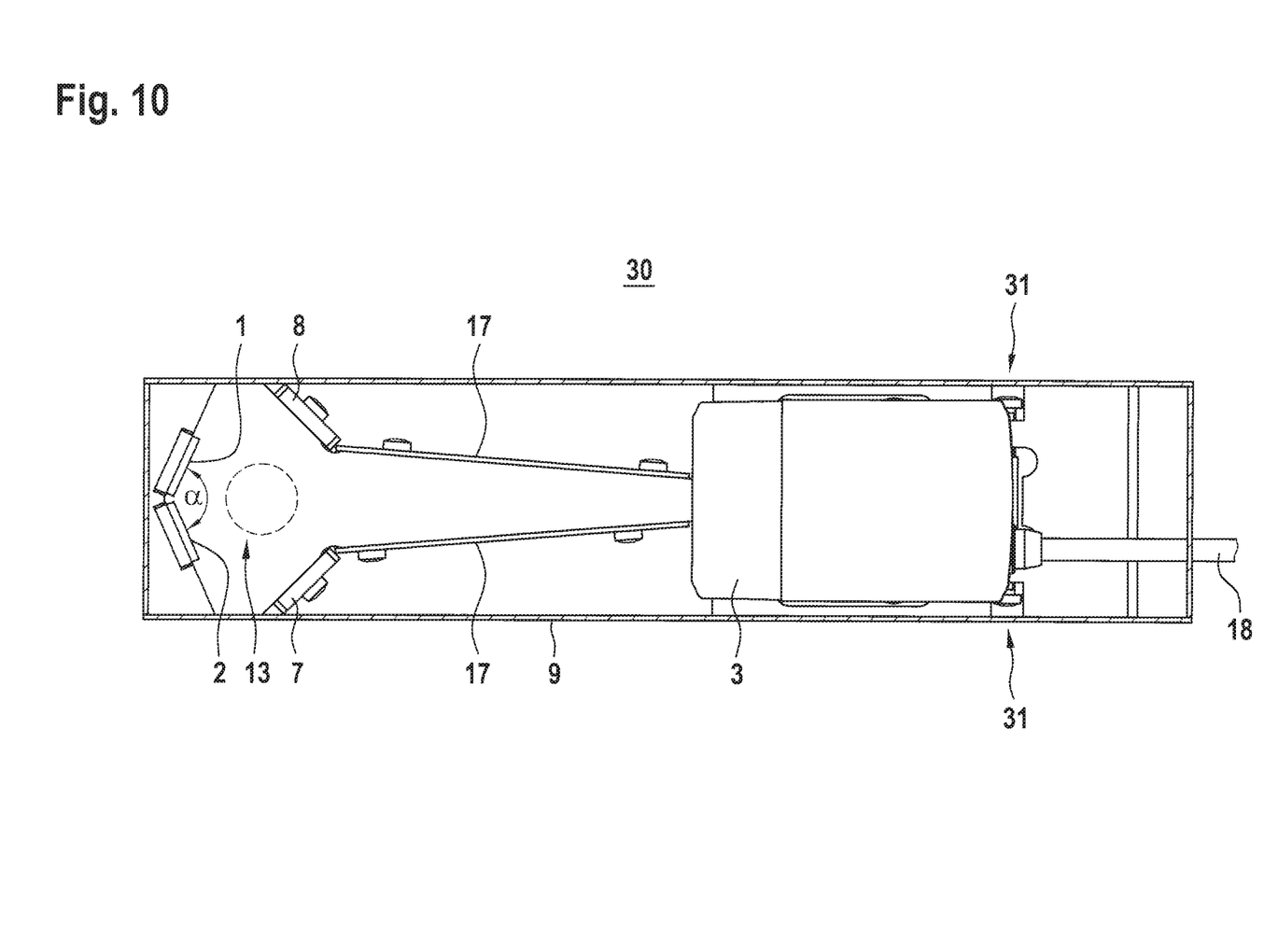
FIG. 10 shows a cross-section through the embodiment as shown in FIG. 9.

FIG. 10 shows a cross-section of the embodiment of the position detector 30 according to FIG. 9. The cross-sectional plane extends horizontally and is located just below the cover plate of the housing, so that the four lateral walls of the housing 9 are intersected and a top view of the elements of the position detector located inside the housing is possible. The means 31 acting from two sides on a base of camera 3 for adjusting the orientation of the camera are clearly visible. Light deflecting elements 1, 2, diffuser elements 7, 8 and shielding elements 17 are arranged mirror-symmetrically to an undrawn center plane of the position detector, wherein the center plane is perpendicular to the cross-sectional plane. The light deflecting elements 1 and 2 are here plane mirrors and define a space segment with an aperture angle $\alpha$. The position determination space and also the camera are located in this space segment. In the case shown $\alpha=133°$, i.e. the normal of the mirrors are each inclined by 23.5° with respect to the central plane ($\alpha=180°-2*23.5°$). The approximate position of the position determination space 13 in the space segment with aperture angle is indicated by a dashed circle. The exact position of position determination space 13 in this space segment is determined in the embodiment shown by the access opening 19 (only shown in FIG. 9). In the arrangement shown here, there is a first and a second field of vision corresponding to the situation shown in FIG. 2 and beam paths corresponding to the situation shown in FIG. 3.

Coming back to the properties and elements of the position detector, the following features may be implemented in the position detector according to the invention.

A focus distance of the camera lens can be adjustable. For example, the image sensor of the camera can have 600 kilo-pixel resolution or higher. Sub-pixel resolution can be achieved by evaluating blurred areas on the imaged edges of an object using image processing software. For example, the image sensor can be designed for black and white images. For example, the image sensor can also be designed to generate red-green-blue (RGB) images. The position detector can, for example, be set up on a surface area of approx. 5 cm×21 cm and thus have a very small space requirement within a robot system. In this dimension, the field-of-view (FOV) in the position determination area can be about 2 cm in size. A resolution of 10 micrometers at the spatial coordinates determined can be achieved with a camera resolution of 600 kilo-pixels or more. The position detector can have means for the adjustment, especially the fine adjustment, of the orientation of the position detector with respect to externally specified coordinates. The position detector may alternatively or additionally have means for the adjustment, in particular the fine adjustment, of the orientation of the camera with respect to other elements of the position detector, for example for the adjustment of the orientation with respect to a light deflecting element or with respect to a housing.

LIST OF REFERENCE NUMERALS

1 First light deflecting element
2 Second light deflecting element
3 Camera
4 Image sensor
5 Lens
6, 6' Light source
7 First diffuser element
8 Second diffuser element
9 Housing
10 Imaging area
11 First field of view
12 Second field of view
13 Position determination area
14 Overlapping area
15 Optical axis
16 Light beams (of the light source)
17 Shielding element
18 Cable
19 Access opening
20 Object
30 Position detector
31 Means for setting the alignment
40 System for determining spatial coordinates
41 Evaluation unit
50 Robot system
51 Well plate
100 Method for determining spatial coordinates of an object in the position determination space of a position detector
101 Method step of positioning the object
102 Method step of generating an image recording
103 Method step of determining the spatial coordinates of the object
104 Method step of evaluation of the first image
105 Method step of evaluation of the second image
106 Method step of calculating the spatial coordinates of the object
$\alpha$ Aperture angle (of the space segment containing the position determination space)

H Horizontal direction (in an image recording)
V Vertical direction (in an image recording)
x x-direction (of a Cartesian coordinate system)
y y-direction (of a Cartesian coordinate system)
z z-direction (of a Cartesian coordinate system)

The invention claimed is:

1. Position detector for generating 3D position information of an object in a position determination space for the object, wherein the position detector comprises
    a camera with a lens and an image sensor, which camera defines an imaging area,
    at least one first light deflecting element arranged in the imaging area,
wherein the camera and the at least one light deflecting element are adapted to simultaneously produce on the image sensor at least two images of the position determination space, a first image being produced by light beams deflected at the first light deflecting element (1), wherein the at least two images differ with respect to the viewing direction of the position determination space,
wherein the position detector further comprises at least one light source arranged to illuminate the position determination space, wherein the position detector further comprises a first diffuser element for diffusely scattering light, characterized in that
the first diffuser element and the first light deflecting element are arranged opposite each other with respect to the position determination space, and wherein the at least one light source is arranged to illuminate the position determination space indirectly via the first diffuser element.

2. Position detector according to claim 1, wherein the position determination space lies in the imaging area of the camera.

3. Position detector according to claim 1, wherein the first light deflecting element is adapted to deflect light on a first planar surface defining a first plane.

4. Position detector according to claim 1, further comprising a second light deflecting element, and wherein the camera and the second light deflecting element are adapted to produce a second image of the at least two images by light beams deflected at the second light deflecting element.

5. Position detector according to claim 4, wherein the second light deflecting element is adapted to deflect light on a second flat surface defining a second plane.

6. Position detector according to claim 1, wherein the first light deflecting element is adapted to deflect light on a first planar surface defining a first plane, further comprising a second light deflecting element, and wherein the camera and the second light deflecting element are adapted to produce a second image of the at least two images by light beams deflected at the second light deflecting element, wherein the second light deflecting element is adapted to deflect light on a second flat surface defining a second plane.

7. Position detector according to claim 6, wherein the first and the second plane intersect in an imaginary straight line which is perpendicular to an optical axis of the camera.

8. Position detector according to claim 7, wherein the imaginary straight line and the optical axis define a plane of symmetry of the position detector.

9. Position detector according to claim 6, wherein the camera, the first light deflecting element) and the second light deflecting element are arranged in such a manner with respect to a central point in the position determination space that a first beam path from the central point via the first light deflecting element through the lens to the image sensor and a second beam path from the central point via the second light deflecting element through the lens to the image sensor in the central point extend orthogonally to each other.

10. Position detector according to claim 6, wherein the first and second planes define four space segments, wherein the camera and the position determination space are arranged in a first space segment of these four space segments and wherein the aperture angle of the first space segment is in the range of 100° to 140°.

11. Position detector according to claim 10, wherein the aperture angle of the first space segment is in the range of 130.0° to 135.0°.

12. Position detector according to claim 6, wherein the position detector comprises a housing surrounding the camera, the first light deflecting element, the position determination space and the second light deflecting element, and wherein the housing has an access opening for introducing at least one end of the object into the position determination space.

13. Position detector according to any one of claims 4 to 9, further comprising a second diffuser element, wherein the second diffuser element and the second light deflecting element are arranged opposite each other with respect to the position determination space and wherein the at least one light source is arranged to illuminate the position determination space indirectly via the second diffuser element.

14. Position detector according to claim 1, wherein the position detector comprises a housing surrounding the camera, the first light deflecting element, the position determination space, and wherein the housing has an access opening for introducing at least one end of the object into the position determination space.

15. Robot system comprising a position detector according to claim 1.

16. Robot system according to claim 15, wherein the robot system is a pipetting robot system.

17. Method for determining spatial coordinates of an object, the method comprising the steps of
    a) positioning at least a part of an object with respect to a camera;
    b) generating at least two images of the object on the image sensor of the camera, wherein at least one of the images is generated by a reflection of the object on a first light-deflecting element and wherein the at least two images reproduce the object from different viewing directions; and
    c) determining the spatial coordinates of the object from the at least two images,
    characterized in that
    said at least one image, which is generated by a reflection of the object, is projected onto the image sensor of the camera as shadow image.

18. Method according to claim 17 for determining spatial coordinates of an object in the position determination space of a position detector,
    wherein in step b) of the generating of the image recording is carried out by means of the camera of the position detector, wherein the image recording contains the first and the second image and wherein the first image is generated by means of beam paths deflected at the first light deflecting element,
    wherein step c) of determining the spatial coordinates of the object comprises the steps of:
    c1) in the image recording generated in step b), evaluating the first image, wherein a first horizontal-vertical position of the object within the image is determined;

c2) in the image recording generated in step b), evaluating the second image, wherein a second horizontal-vertical position of the object within the image is determined;
c3) calculating the spatial coordinates of the object as a function of the first and second horizontal-vertical positions.

19. Method according to claim 18, wherein in step c3) the calculation of the spatial coordinates of the object is carried out as a function of the mean value of the first and second horizontal-vertical positions and the distance of the first and second horizontal-vertical positions.

20. Method for operating a robot system, comprising the steps of
determining a first spatial coordinate of a reference point of a first object while the first object is held by the robot system in a position determination space by performing the following steps:
a) positioning at least a part of the first object with respect to a camera,
b) generating at least two images of the first object on an image sensor of the camera, wherein at least one of the images is generated by a reflection of the first object on a first light-deflecting element and wherein the at least two images reproduce the first object from different viewing directions, and
c) determining first spatial coordinates of the first object from the at least two images,
wherein said at least one image, which is generated by a reflection of the first object, is projected onto the image sensor of the camera as a shadow image;
determining a first parameter set of a first motion sequence of the robot system, by means of which the robot system brings the reference point of the first object from the position determination space to a target position;
determining a second spatial coordinate of a reference point of a second object while the second object is held by the robot system in the position determination space by performing the following steps:
a) positioning at least a part of the second object with respect to the camera,
b) generating at least two images of the second object on the image sensor of the camera, wherein at least one of the images is generated by a reflection of the second object on the first light-deflecting element and wherein the at least two images reproduce the second object from different viewing directions, and
c) determining second spatial coordinates of the second object from the at least two images,
wherein said at least one image, which is generated by a reflection of the second object, is projected onto the image sensor of the camera as a shadow image;
correcting the first parameter set of the first motion sequence as a function of a difference between the first and second spatial coordinates to obtain a second parameter set for a second motion sequence of the robot system;
performing the second motion sequence based on the second parameter set with the second object.

21. The method according to claim 20, wherein the robot system is a pipetting robot system and wherein the first object is a pipette tip and the second object is a pipette tip.

22. System for determining spatial coordinates of an object in a position determination space, wherein the system comprises a position detector according to claim 1 and an evaluation unit, wherein the image sensor and the evaluation unit are operatively connected for the transmission of image data and wherein the system is adapted to perform the method.

* * * * *